Sept. 27, 1955      J. A. MASON      2,718,951
ELECTROMAGNETIC FRICTION DEVICE AND CONTROL
Filed Aug. 25, 1950
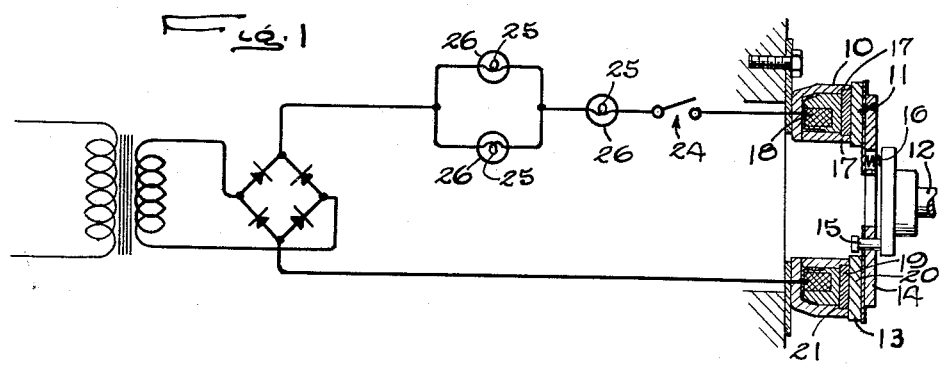
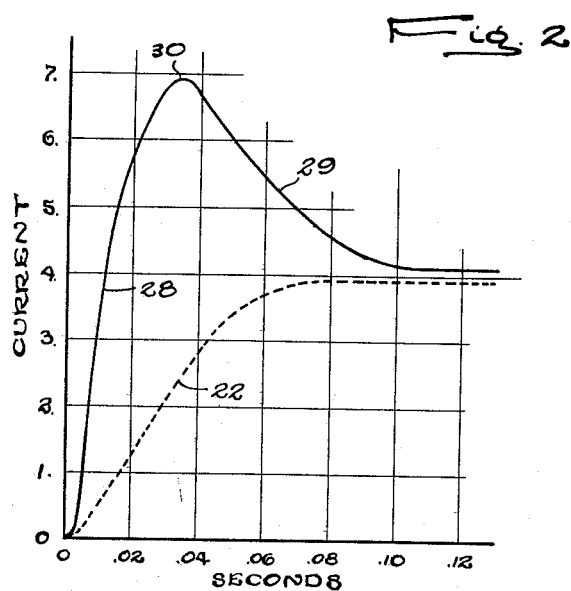
INVENTOR
James A. Mason
By Carlson, Pitzner, Hubbard & Wolfe
ATTORNEY

United States Patent Office 2,718,951
Patented Sept. 27, 1955

2,718,951

ELECTROMAGNETIC FRICTION DEVICE AND CONTROL

James A. Mason, Beloit, Wis., assignor to Warner Electric Brake & Clutch Company, a corporation of Illinois Application August 25, 1950, Serial No. 181,392

3 Claims. (Cl. 192—84)

This invention relates to the control of friction clutches and brakes for transmitting or retarding rotary motion and more particularly to the control of devices of the type in which the gripping engagement of the coacting friction elements is produced by or results from energization of an electromagnet which usually has an annular ring-like core of U-shaped cross section encircling a multi-turn annular winding. Owing to the small air gap in the flux circuit, the comparatively large number of turns in the magnet coil, and the heavy unlaminated pole sections, the inductance of such a magnet is relatively high and full operating current and therefore full clutching or braking torque is not attained immediately upon the application of a given voltage to the magnet coil but is delayed for a substantial part of a second. This is sufficient to render the device unsuited for many applications. In an attempt to overcome this difficulty, various complicated electric circuits including the condensers, switches, or electronic devices have been used to apply a momentary over-voltage for energizing the magnet.

The primary object of the present invention is to provide for momentary over-energization of the magnet in a clutch or brake of the above character by a circuit arrangement which is simpler, less expensive, and more durable than the arrangements heretofore employed.

A more detailed object is to carry out the foregoing object by interposing in series with the magnet winding a resistor. The resistance value is low at ordinary room temperatures but increases rapidly with an increase in temperature which is changed over a wide range by the application of current of the value utilized in effecting full energization of the clutch or brake magnet.

Other objects and advantages of the invention will become apparent from the following detailed description taken in connection with the accompanying drawings, in which Figure 1 is a diametrical sectional view of an electromagnetic brake adapted to be controlled in accordance with the present invention.

Fig. 2 is a time chart showing the changes in the brake energizing current under different conditions.

The invention is shown in the drawings in conjunction with an electromagnetic friction brake having a nonrotatable magnetic ring 10 adapted to be drawn into axial gripping engagement with the face of an armature ring 11 which rotates with a shaft 12 or other part to be retarded. Herein, the armature comprises a series of magnetic segments 13 arranged end to end and around and secured to a disk 14 which is coupled to the shaft through angularly spaced pins 15. Springs 16 lightly urge the armature against the face of the magnet.

The magnet comprises a rigid ring of iron of U-shaped cross section having radially spaced pole pieces 17 enclosing a multiple turn coil 18 and terminating in faces 19 which are disposed in a common plane and spanned by the armature segments to provide a closed magnetic flux circuit encircling the coil 18 at all points around the latter. To sustain the major portion of the frictional wear, segments 20 of suitable friction material are disposed between the pole pieces 17 and seated against shoulders 21 with their faces flush with the pole faces 19.

In a typical brake construction of the above character having an outside diameter of about 5 inches and a coil with 160 turns, the direct current resistance would be about 3.0 ohms. If such a magnet is energized by a direct current voltage of about 12 volts, the effective current flowing through the coil 18 will increase gradually along the line 22 (Fig. 2) and, owing to the high inductance of the magnet, will not attain its maximum value of 4.0 amperes until .07 of a second has elapsed following closing of the energizing circuit.

The present invention contemplates reducing the delay in the attainment of the desired maximum current by energizing the coil 18 through a resistance whose value increases rapidly over a wide range so as to produce a momentary over-voltage substantially higher than the desired ultimate voltage and decreasing instantaneously before the magnet coil is damaged. I have discovered that the filament of an ordinary incandescent light bulb possesses the foregoing characteristics, namely, a wide difference between the value of its resistance when cold as compared to the resistance when equilibrium has been obtained at or near incandescence and second a time lag in attaining equilibrium approximately equal to that of a high inductance magnet of the character above described. Based on this discovery, the primary aim of the invention is attained by connecting the coil 18 in series with a suitable control switch 24 and a filament 25 of one or more incandescent lamps 26 of such size as to produce the desired final voltage across the terminals of the brake coil 18. Herein, three 25 watt lamps 26 are employed in order to attain the desired resistance value by using electric lamps of standard size. Two of the lamp filaments adapted to draw 25 watts at 12 volts are connected in parallel with each other and in series with the third bulb which is adapted to draw 25 watts at 6 volts. The total resistance of this combination of filaments is about 0.5 ohm at ordinary temperatures and about 5.0 ohms when incandescent.

When a direct current voltage, for example 37 volts, is applied to the series circuit above described, the current in the coil 18 will rise rapidly along the line 28 and in the short interval of .03 of a second will produce a current of nearly 7.0 amperes at 30. As the filaments heat up to or near incandescence, the resistance thereof increases rapidly about 10 or 12 times causing a corresponding drop in the voltage across the coil thus rapidly decreasing the current in the coil 18 along the line 29. The desired ultimate value of near 4.0 amperes is attained in about .010 of a second as the filament attains its equilibrium temperature at or near incandescence. This reduction is sufficiently rapid to avoid overheating of the coil 18.

Under such an over-voltage, the high inductance of the magnet is overcome and the current in the coil 18 attains the desired ultimate value of 4.0 amperes in about .01 of a second. Since the total magnet flux follows the energizing current, the full torque of the brake will be attained almost instantaneously thus avoiding the delay which has heretofore limited the service use of such brakes. At the same time, this improved control is achieved without switches, condensers, or other complicated and less reliable electrical devices and by the use of inexpensive and readily available resistance elements.

I claim as my invention:

1. The combination of, coaxially arranged magnet and armature rings composed of unlaminated magnetic material and mounted for relative rotation and axial frictional gripping engagement when the magnet is energized, means supporting said rings with their friction faces disposed close to and in substantial engagement with each other when the magnet is deenergized, an annular multiple turn inductive winding mounted on the magnet ring and adapted to be energized to a predetermined voltage to draw said rings into gripping engagement and develop a frictional torque which increases progressively as the inductance of said magnet is overcome, means providing an energizing circuit for said winding including an electric lamp filament connected in series with the winding and having a resistance value which at incandescence is several times the value when cold, and means for applying across said filament and said winding a voltage substantially higher than said predetermined voltage and correlated with the resistances of the filament and winding so as to produce said predetermined voltage across said winding when said filament has attained its maximum temperature.

2. The combination of, an annular multiple turn inductive winding, coaxially arranged magnet and armature rings of substantially solid magnetic material enclosing said winding and coacting to form a flux path surrounding the winding, said means having opposed friction faces, means supporting said rings for relative rotation about their common axis and maintaining the opposed friction faces of the rings substantially in contact with each other when said winding is deenergized whereby to maintain said flux path substantially closed, said rings, when a predetermined voltage is applied to said winding, being drawn into gripping engagement to develop a frictional torque which increases progressively and attains a predetermined desired value when the inductance of the magnet is overcome, means providing a single energizing circuit through said winding including an electric lamp having a filament in series with the winding, and means for applying across said filament and said winding a voltage correlated in magnitude with the resistances of the filament and winding and capable of heating the filament substantially to incandescence while applying across said winding a momentary voltage which is substantially higher than said predetermined voltage and which, by heating of said filament, is reduced substantially to said predetermined voltage at a time approximately coincident with the overcoming of said magnet inductance.

3. The combination of an annular multiple turn inductive winding, coaxially arranged magnet and armature rings of substantially solid magnetic material enclosing said winding and coacting to form a flux path surrounding the winding, said means having opposed friction faces, means supporting said rings for relative rotation about their common axis and maintaining the opposed friction faces of the rings substantially in contact with each other when said winding is deenergized whereby to maintain said flux path substantially closed, said rings, when said winding is energized, being drawn into gripping engagement to develop a frictional torque which increases progressively and attains full value when the inductance of the magnet is overcome, means providing a single energizing circuit through said winding including an electric lamp having a filament in series with the winding, and means for applying across said filament and said winding a voltage sufficient to effect substantial and rapid heating of the filament and a resultant reduction in the voltage applied to an equilibrium value approximately coincident with the overcoming of said magnet inductance.

References Cited in the file of this patent

UNITED STATES PATENTS

| | | |
|---|---|---|
| 1,023,921 | Brown | Apr. 23, 1912 |
| 1,094,733 | Lyle | Apr. 28, 1914 |
| 1,142,852 | Simon | June 15, 1915 |
| 1,321,003 | Billings | Nov. 4, 1919 |
| 1,915,566 | Younghusband | June 27, 1933 |
| 2,395,772 | Winther | Feb. 26, 1946 |
| 2,421,757 | Oetzel | June 10, 1947 |
| 2,519,449 | Findley | Aug. 22, 1950 |
| 2,578,716 | Oetzel | Dec. 18, 1951 |